(12) United States Patent
Fujita et al.

(10) Patent No.: US 9,242,400 B2
(45) Date of Patent: Jan. 26, 2016

(54) RESIN INJECTION MOLDING METHOD AND RESIN INJECTION MOLDED PRODUCT

(71) Applicants: Kumi Kasei Co., Ltd., Tokyo (JP); UBE MACHINERY CORPORATION, LTD., Ube-shi (JP)

(72) Inventors: Yoshikazu Fujita, Tokyo (JP); Yoshiaki Imai, Tokyo (JP); Etsuo Okahara, Ube (JP)

(73) Assignees: Kumi Kasei Co., Ltd. (JP); UBE MACHINERY CORPORATION, LTD. (JP)

( * ) Notice: Subject to any disclaimer, the term of this patent is extended or adjusted under 35 U.S.C. 154(b) by 0 days.

(21) Appl. No.: 14/408,473

(22) PCT Filed: Jun. 20, 2013

(86) PCT No.: PCT/JP2013/066946
§ 371 (c)(1),
(2) Date: Dec. 16, 2014

(87) PCT Pub. No.: WO2013/191241
PCT Pub. Date: Dec. 27, 2013

(65) Prior Publication Data
US 2015/0190953 A1    Jul. 9, 2015

(30) Foreign Application Priority Data
Jun. 22, 2012 (JP) .................. 2012-141382

(51) Int. Cl.
*B29C 45/73* (2006.01)
*B29C 45/00* (2006.01)
*C08L 23/12* (2006.01)
*B29K 23/00* (2006.01)
*B29K 21/00* (2006.01)
*B29L 31/00* (2006.01)

(52) U.S. Cl.
CPC ......... *B29C 45/0001* (2013.01); *B29C 45/0025* (2013.01); *C08L 23/12* (2013.01); *B29K 2021/00* (2013.01); *B29K 2023/10* (2013.01); *B29L 2031/00* (2013.01)

(58) Field of Classification Search
CPC .................. B29C 45/0025; B29C 2045/1717; B29C 2045/7343
See application file for complete search history.

(56) References Cited

U.S. PATENT DOCUMENTS

| 4,432,928 A * | 2/1984 | Barnard ................. B29C 45/00 264/327 |
| 2003/0091675 A1* | 5/2003 | Okamoto ............... B29C 45/14 425/126.1 |
| 2006/0076712 A1* | 4/2006 | Yonemochi ......... B29C 37/0028 264/255 |
| 2009/0246471 A1* | 10/2009 | Zawacki ............. B29C 44/0415 428/157 |

FOREIGN PATENT DOCUMENTS

| JP | 03-281213 A | 12/1991 |
| JP | 06-315961 A | 11/1994 |
| JP | 08-104792 A | 4/1996 |
| JP | 10-296733 A | 11/1998 |
| JP | 2000-043110 A | 2/2000 |
| JP | 2000-176944 A | 6/2000 |
| JP | 2000-289073 A | 10/2000 |
| JP | 2005-313330 A | 11/2005 |
| WO | 2007129673 A1 | 11/2007 |

OTHER PUBLICATIONS

Japanese Patent Office, "International Search Report" corresponding to related PCT Patent Application No. PCT/JP2013/066946, dated Oct. 1, 2013, 5 pages.

* cited by examiner

*Primary Examiner* — Jill Heitbrink
(74) *Attorney, Agent, or Firm* — Kolisch Hartwell, P.C.

(57) ABSTRACT

A resin injection molding method of molding a resin by injection-filling an inside of a mold cavity formed by mold-clamping a pair of a design surface mold and a non-design surface mold, with a melted thermoplastic polypropylene resin composition, the method including: setting a temperature of each cavity-forming surface of the design surface mold and the non-design surface mold prior to the injection filling to 60° C. to 120° C., with the temperature of the cavity-forming surface of the design surface mold being 5° C. to 50° C. higher than the temperature of the cavity-forming surface of the non-design surface mold; and causing the resin pressure to reach a negative pressure within 7 seconds after injection filling is complete, wherein the thermoplastic polypropylene resin composition contains a crystalline polypropylene resin and a rubber component and a content of the rubber component is 1 mass % to 40 mass %.

4 Claims, 2 Drawing Sheets

RESIN INJECTION MOLDING METHOD AND RESIN INJECTION MOLDED PRODUCT

TECHNICAL FIELD

The present invention relates to a resin injection molding method and a resin injection molded product.

Priority is claimed on Japanese Patent Application No. 2012-141382, filed Jun. 22, 2012, the content of which is incorporated herein by reference.

BACKGROUND ART

An injection molded product which is injection-molded using resins such as polyolefin resins, polystyrene resins, ABS resins, polycarbonate resins, and polyamide resins has been widely used as a resin product. For example, in automobile interior parts, an injection molded product which is provided with a rib or boss for providing rigidity, structural strength, or the like, or a clip and the like (hereinafter, referred to as "rib and the like") for attachment, on a non-design surface (rear surface) of a plate-like portion, has been used.

Such an injection molded product can be obtained by, for example, molding and forming a resin by injection-filling a mold cavity, which is formed by mold-clamping a design surface mold forming a design surface side of the injection molded product and a non-design surface mold forming a non-design surface side. In the molding of the injection molded product, in some cases, a sink mark is generated on a surface of the obtained injection molded product caused by volume shrinkage of the resin which is injection-filled in the mold cavity. Particularly, in the case of the above-described injection molded product provided with the rib and the like on a non-design surface side of a plate-like portion, the resin of the portion coming into contact with the rib and the like on the plate-like portion is easily drawn to the side of the rib and the like during molding, and thus, sink marks are easily generated on a design surface of the portion.

Examples of the method of controlling the generation of sink marks on the design surface of the injection molded product includes the following methods (i) to (iv).

(i) A method of performing injection molding in a state in which the temperature of a cavity-forming surface of a mold is maintained at greater than or equal to a glass transition temperature of a resin (Patent Document 1).

(ii) A method of injection-filling the inside of a mold cavity with a resin, subsequently injecting gas into the mold cavity from a non-design surface mold side, and molding the resin by pressing the resin into the cavity-forming surface of a design surface mold using the gas pressure (Patent Document 2).

(iii) A method of injection-filling a mold cavity of a mold, which is heated to a temperature higher than or equal to a glass transition temperature or higher than or equal to a thermal deformation temperature of a resin, with the resin, and subsequently lowering the temperature of the mold of a design surface mold and subsequently a non-design surface mold to a temperature lower than or equal to the glass transition temperature or lower than or equal to the thermal deformation temperature, and subsequently lowering the temperature of the mold a non-design surface mold to the temperature lower than or equal to the glass transition temperature or lower than or equal to the thermal deformation temperature (Patent Document 3).

(iv) A method of performing injection-molding using a mold in which a heat insulation layer is formed on a cavity-forming surface of a design surface mold and a surface metal layer is further formed on the heat insulation layer (Patent Document 4).

Meanwhile, in automobile interior parts, a crystalline polypropylene resin is used for the injection molding in many cases. The crystalline polypropylene resin shrinks volume greatly due to crystallization. For this reason, sink marks are easily generated in an injection molded product using the crystalline polypropylene resin compared to an injection molded product using other resins. For example, as to the method (i), molding of the polypropylene resin is generally performed at about 40° C. of a surface temperature of a mold. In addition, it has been known that the glass transition temperature of the polypropylene resin is −20° C. That is, the general molding condition of the polypropylene resin meets the condition disclosed in Patent Document 1, but it is a well-known fact that it is impossible to suppress sink marks formed during molding even under such a condition.

Similarly, even in the methods (ii) and (iv), it is impossible to sufficiently suppress the generation of sink marks on the design surface when molding the polypropylene resin.

In addition, in fields such as automobile interior parts, reduction of the thickness of an injection molded product has been carried out in view of weight reduction or energy conservation. When the thickness of the injection molded product provided with a rib and the like on the non-design surface side of the plate-like portion is reduced, the thickness ratio of the portion which is provided with the rib and the like to the portion which is not provided with the rib and the like in the injection molded product becomes large. Accordingly, the resin forming the plate-like portion is drawn to the rib and the like during the molding, thereby promoting generation of noticeable sink marks on the design surface of the portion. Therefore, it is more difficult to perform the suppression of sink marks.

From the above, in the injection molded product using the crystalline polypropylene resin, the flexibility of design of the product has been impaired when reducing the thickness of the product for the purpose of weight reduction.

In addition, in the method (iii), there is a problem in that energy loss is extremely great since heating and cooling of the mold is repeated while continuously manufacturing the injection molded product. In addition, it is necessary to use a special mold in the method (iv), which is disadvantageous even in view of maintenance of the mold.

PRIOR ART DOCUMENTS

Patent Documents

[Patent Document 1] Japanese Unexamined Patent Application, First Publication No. H6-315961
[Patent Document 2] Japanese Unexamined Patent Application, First Publication No. 2000-289073
[Patent Document 3] Japanese Unexamined Patent Application, First Publication No. H10-296733
[Patent Document 4] PCT International Publication No. WO 2007/129673

SUMMARY OF THE INVENTION

Problems to be Solved by the Invention

An object of the present invention is to provide a resin injection molding method through which it is possible to manufacture an injection molded product in which generation of sink marks on a design surface is sufficiently suppressed using a crystalline polypropylene resin with reduced energy loss even without using a special mold, and the high quality resin injection molded product which can be obtained through the injection molding method.

Means for Solving the Problems

A first aspect of the present invention provides, a resin injection molding method of molding a resin by injection-filling an inside of a mold cavity, which is formed by mold-clamping a pair of design surface mold and non-design surface mold, with a melted thermoplastic polypropylene resin composition, the method includes: setting a temperature of each of cavity-forming surfaces of the design surface mold and the non-design surface mold prior to the injection filling to 60° C. to 120° C. and setting the temperature of the cavity-forming surface of the design surface mold to be higher than the temperature of the cavity-forming surface of the non-design surface mold by 5° C. to 50° C.; and causing the resin pressure to reach to a negative pressure within 7 seconds after completion of the injection filling of the thermoplastic polypropylene resin composition, wherein the thermoplastic polypropylene resin composition contains a crystalline polypropylene resin and a rubber component and a content of the rubber component is 1 mass % to 40 mass %.

In the resin injection molding method according to the first aspect of the present invention, it is preferable that the surface area per unit area of the cavity-forming surface of the design surface mold be larger than the surface area per unit area of the cavity-forming surface of the non-design surface mold.

In addition, it is preferable that the resin pressure reach to the negative pressure by reducing a mold clamping force (unit: N) of the design surface mold and the non-design surface mold to a value which is obtained by multiplying the product projection area (unit: $mm^2$) of the mold cavity by a pressure of 1 MPa to 20 MPa after the completion of the injection filling of the thermoplastic polypropylene resin composition.

According to a second aspect of the present invention, a resin injection molded product is manufactured through the above-described injection molding method.

Effects of the Invention

According to a resin injection molding method according to a first aspect of the present invention, it is possible to obtain a resin injection molded product in which generation of sink marks on a design surface is sufficiently suppressed using a crystalline polypropylene resin with reduced energy loss even without using a special mold.

A resin injection molded product according to a second aspect of the present invention is formed using the crystalline polypropylene resin, and the generation of sink marks on the design surface is sufficiently suppressed and thus the product is high quality.

DETAILED DESCRIPTION OF THE INVENTION

[Resin Injection Molding Method]

A resin injection molding method according to a first embodiment of the present invention is a method of molding a resin by injection-filling the inside of a mold cavity, which is formed by mold-clamping a pair of design surface mold and non-design surface mold, with a melted thermoplastic polypropylene resin composition (hereinafter, referred to as a "thermoplastic PP resin composition"). Hereinafter, a resin injection molding method using a mold 100 exemplified in FIG. 1 will be described as an example of the resin injection molding method of the present invention.

Figure 1:
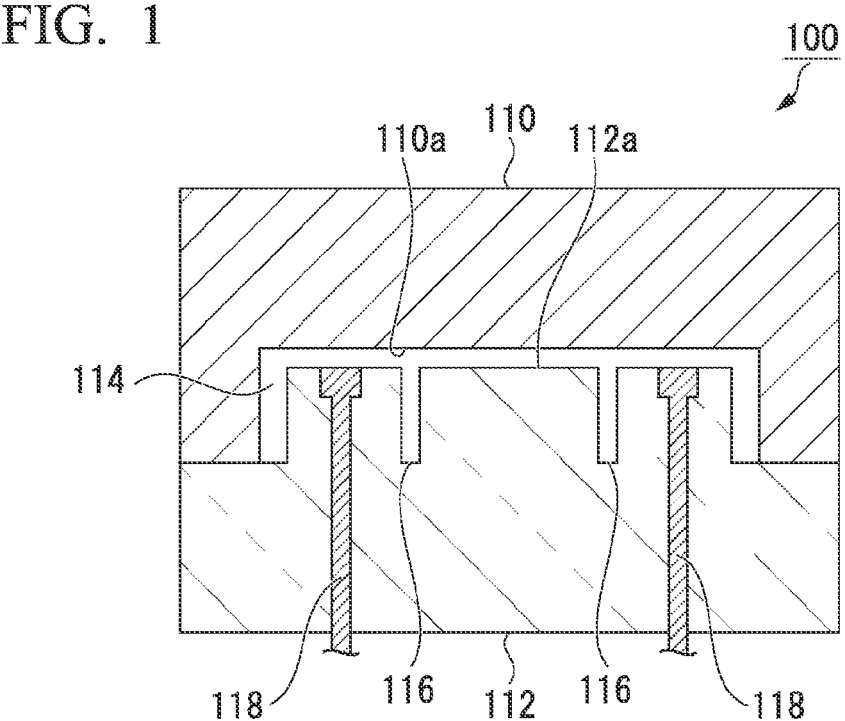
FIG. 1 is a cross-sectional view showing an example of a mold used in a resin injection molding method according to a first embodiment of the present invention.

As shown in FIG. 1, the mold 100 has a design surface mold 110 for forming a design surface side of a resin injection molded product (hereinafter, simply referred to as an "injection molded product") and a non-design surface mold 112 for forming a non-design surface side of the injection molded product. A plurality of recess portions (which are expressed as two recess portions 116, 116 in FIG. 1 for simplification) for forming a rib and the like on the non-design surface side of the injection molded product are formed on a cavity-forming surface 112a of the non-design surface mold 112. The mold 100 is made such that a mold cavity 114 is formed by mold-clamping the design surface mold 110 and the non-design surface mold 112. The mold cavity 114 has a shape complementary to the injection molded product having a plate-shaped portion, side wall portions perpendicularly extending from the non-design surface side of both ends of the plate-shaped portion, and a plurality of ribs and the like perpendicularly extending from the non-design surface side between the pair of side wall portions in the plate-shaped portion.

In addition, the non-design surface mold 112 is provided with ejector pins 118, 118 for releasing the injection molded product from the mold by pressing the product after injection molding.

Examples of the resin injection molding method using the mold 100 include a method having the following injection filling process, molding process, and mold releasing process.

Injection filling process: a process of injection-filling the inside of the mold cavity 114, which is formed by mold-clamping the design surface mold 110 and the non-design surface mold 112, with a melted thermoplastic PP resin composition.

Figure 2:
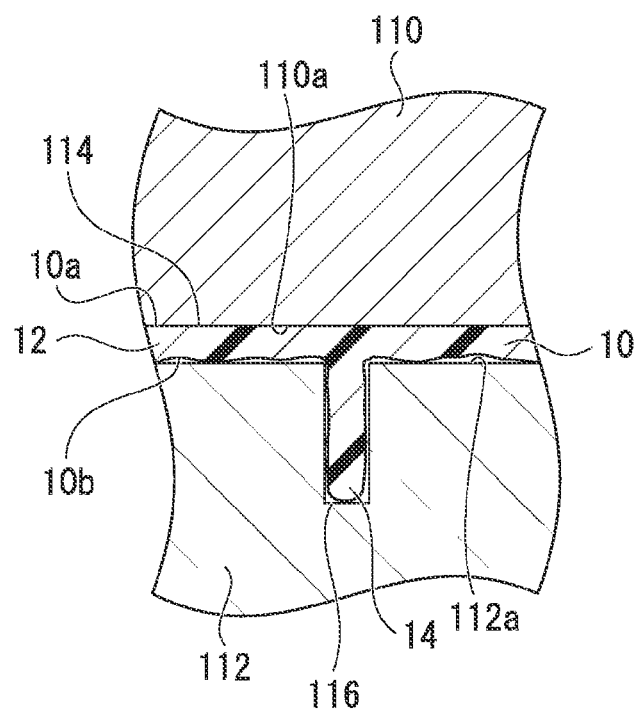
FIG. 2 is an enlarged cross-sectional view showing a state in which an injection molded product is manufactured through the resin injection molding method according to the first embodiment of the present invention using the mold of FIG. 1.

Molding process: a process of obtaining an injection molded product 10 as shown in FIG. 2 by molding the thermoplastic PP resin composition such that the resin pressure reaches to a negative pressure within 7 seconds after completion of the injection filling of the thermoplastic PP resin composition.

Mold releasing process: a process of releasing the molded injection molded product 10 by opening the design surface mold 110 and the non-design surface mold 112.

(Thermoplastic PP Resin Composition)

The thermoplastic PP resin composition used in the resin injection molding method according to the first embodiment of the present invention contains a crystalline polypropylene resin (hereinafter, referred to as a "crystalline PP resin") and a rubber component.

A well-known crystalline PP resin can be used as a crystalline PP resin without any restriction and examples thereof include a homopolymer of propylene; and a-olefin copolymer of propylene and a small amount of ethylene, and the like.

Examples of the rubber components include ethylene-propylene rubber (EPR) and ethylene-propylene-diene rubber (EPDM).

The content of the rubber component in the thermoplastic PP resin composition is 1 mass % to 40 mass %, preferably 5 mass % to 35 mass %, and more preferably 10 mass % to 30 mass %. If the content of the rubber component is higher than or equal to the lower limit value (1 mass %), volume shrinkage of the thermoplastic PP resin composition becomes smaller and a state in which the thermoplastic PP resin composition and the cavity-forming surface 110a of the design surface mold 110 are in close contact with each other is easily maintained during molding, thereby suppressing generation of sink marks on the design surface of the injection molded product. In contrast, if the content of the rubber component is lower than the lower limit value (1 mass %), the volume shrinkage of the thermoplastic PP resin composition becomes larger and a state in which the thermoplastic PP resin composition and the cavity-forming surface 110a of the design surface mold 110 are in close contact with each other is hardly maintained during molding, and therefore, the effect of suppressing sink marks is not exhibited. Moreover, if the content of the rubber component exceeds an upper limit value (40 mass %), it is difficult to maintain the physical property of the polypropylene resin, and therefore, practical use of the thermoplastic PP resin composition as a product is poor.

The thermoplastic PP resin composition used in the first embodiment of the present invention may contain components other than the crystalline PP resin and the rubber component as long as they do not deteriorate the effect of the present invention. Examples of other components include reinforcing materials such as talc or glass fibers, pigments for coloring, and antioxidants for inhibiting deterioration.

(Injection Filling Process)

In the injection filling process, the temperature T1 of the cavity-forming surface 110a of the design surface mold 110 and the temperature T2 of the cavity-forming surface 112a of the non-design surface mold 112 prior to the injection filling of the thermoplastic PP resin composition are set to 60° C. to 120° C., and the temperature T1 of the cavity-forming surface 110a of the design surface mold 110 is set to be higher than the temperature T2 of the cavity-forming surface 112a of the non-design surface mold 112 by 5° C. to 50° C. Then, the inside of the mold cavity 114, which is formed of the design surface mold 110 and the non-design surface mold 112 in a state where the temperature is set in this manner, is injection-filled with the melted thermoplastic PP resin composition.

The generation of sink marks on the design surface of the obtained injection molded product is suppressed by setting the temperature T1 and the temperature T2 to be such conditions prior to the injection filling. The following is considered to be a primary factor for which it is possible to obtain such an effect.

Figure 3:
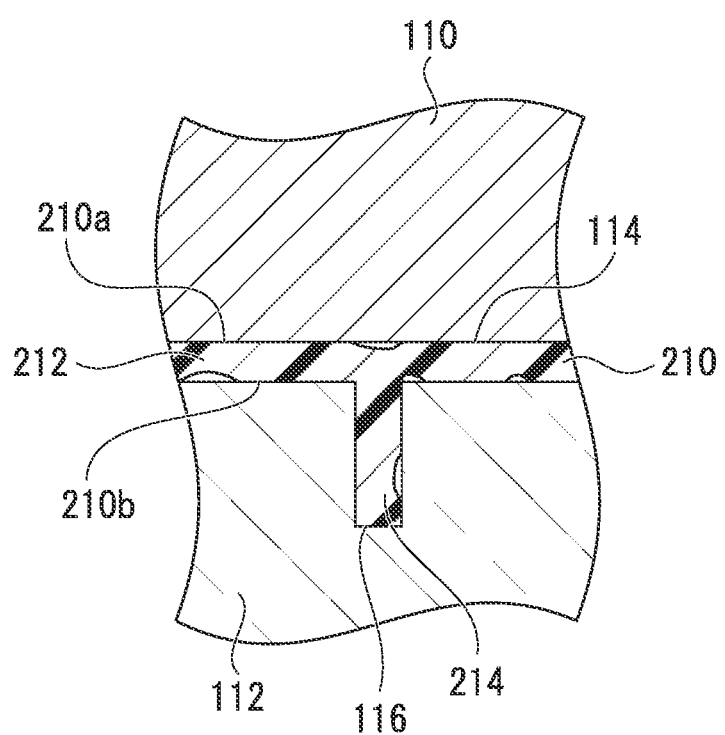
FIG. 3 is an enlarged cross-sectional view showing a state in which an injection molded product is manufactured through a production method of the related art using the mold of FIG. 1.

The crystalline PP resin is a resin in which sink marks is easily generated since it has great volume shrinkage during molding. Particularly, when manufacturing an injection molded product using the crystalline PP resin of which the thickness is reduced, in the method of the related art in which the temperature T1 and the temperature T2 are set to be the same as each other, the generation of sink marks on the side of a design surface 210a or on the side of a non-design surface 210b of an obtained injection molded product 210 is significant, as shown in FIG. 3.

In contrast, in the resin injection molding method according to the first embodiment of the present invention, the temperature of the cavity-forming surface 112a of the non-design surface mold 112 is lower than that of the cavity-forming surface 110a of the design surface mold 110, and therefore, the thermoplastic PP resin composition which is injection-filled in the mold cavity 114 on the side of the non-design surface mold 112 is more promptly cooled compared to the side of the design surface mold 110. Accordingly, a gap is easily generated between the side of the non-design surface mold 112 and the resin molded product due to volume shrinkage of the thermoplastic PP resin composition within the mold cavity 114. Accordingly, it is considered that the change of the shape of the thermoplastic PP resin composition due to the volume shrinkage within the mold cavity 114 occurs such that the composition shrinks in a direction from the side of the non-design surface mold 112 toward the side of the design surface mold 110. Furthermore, the temperature of the cavity-forming surface 110a of the design surface mold 110 is set to 65° C. to 120° C., and thus, the cooling of the resin is slow compared to general molding. For this reason, it is considered that, by maintaining a state in which the thermoplastic PP resin composition is in close contact with the cavity-forming surface 110a of the design surface mold 110 over a long period of time during molding, sink marks which are caused by the volume shrinkage is concentrated on a side of a non-design surface 10b of the injection molded product 10 as shown in FIG. 2, thereby suppressing the generation of sink marks on a side of a design surface 10a of the injection molded product 10. In this manner, in the resin injection molding method according to the first embodiment of the present invention, the generation of sink marks on the design surface side is consequently suppressed because the generated sink marks are concentrated on the non-design surface side without entirely suppressing the generation of sink marks. The non-design surface of the injection molded product is not a surface exposed to consumers generally, and therefore, there is no problem with a product made therefrom at all even if there is an increased number of sink marks on the non-design surface side.

The temperature T1 of the cavity-forming surface 110a of the design surface mold 110 is preferably 65° C. to 120° C., more preferably 75° C. to 118° C., and still more preferably 80° C. to 115° C. If the temperature T1 is higher than or equal to the lower limit value (65° C.), the generation of sink marks on the design surface 10a of the injection molded product 10 is easily suppressed. In addition, if the temperature T1 is lower than or equal to the upper limit value (120° C.), crystallization of the crystalline PP resin easily progresses, and therefore, it is easy to suppress deformation of the injection molded product 10 while releasing the product from the mold even without extending the cooling time.

The temperature T2 of the cavity-forming surface 112a of the non-design surface mold 112 may be appropriately set to higher than or equal to 60° C. and set to be within a range in which the temperature difference (T1–T2) between the cavity-forming surface 110a of the design surface mold 110 and the cavity-forming surface 112a of the non-design surface mold 112 is +5° C. to +50° C.

By setting the temperature T1 and the temperature T2 to be higher than or equal to 60° C., the volume shrinkage of the thermoplastic PP resin composition during molding becomes small. Thus, the state in which the thermoplastic PP resin composition is in close contact with the cavity-forming surface 110a of the design surface mold 110 can be maintained over a long period of time during the molding, thereby suppressing the generation of sink marks on the design surface. In addition, the weld appearance of the obtained injection molded product also improves.

The temperature difference (T1−T2) between the cavity-forming surface 110a of the design surface mold 110 and the cavity-forming surface 112a of the non-design surface mold 112 is preferably +5° C. to +30° C., and more preferably +5° C. to +20° C. If the temperature difference (T1−T2) is greater than or equal to +5° C., it is possible to suppress the generation of sink marks on the design surface 10a of the injection molded product 10. If the temperature difference (T1−T2) is less than or equal to the upper limit value (+30° C.), it is easy to suppress prompt progress of crystallization of the crystalline PP resin on the side of the non-design surface mold 112. For this reason, the thermoplastic PP resin composition easily shrinks in a direction from the side of the non-design surface mold 112 toward the side of the design surface mold 110. By concentrating the sink marks on the non-design surface side, generation of sink marks on the design surface is easily suppressed.

The form of controlling the temperature T1 of the cavity-forming surface 110a of the design surface mold 110 and the temperature T2 of the cavity-forming surface 112a of the non-design surface mold 112 is not particularly limited. The temperature T1 and the temperature T2 may be controlled by heating only the vicinity of the cavity-forming surfaces 110a, 112a of the design surface mold 110 and the non-design surface mold 112 and may be controlled by entirely heating the design surface mold 110 and the non-design surface mold 112. In addition, the heating method is not also limited and a well-known heating method can be employed without restriction.

The temperature of the thermoplastic PP resin composition to be injection-filled is preferably 180° C. to 240° C. In addition, the injection filling time of the thermoplastic PP resin composition is preferably 0.1 seconds to 10 seconds. The injection filling time is the time from a start to a completion of the injection filling.

(Molding Process)

In the molding process, molding is performed in a manner that the resin pressure within the mold reaches to a negative pressure within 7 seconds after completion of the injection filling of the thermoplastic PP resin composition. Accordingly, a free surface can be created before a skin layer is developed on the non-design surface side, and therefore, it is possible to suppress the generation of sink marks on the design surface by sufficiently concentrating sink marks on the non-design surface side.

The time t until the resin pressure reaches to a negative pressure after the completion of the injection filling (hereinafter, referred to as a "negative pressure arrival time t") is preferably within 5 seconds and more preferably within 3 seconds. The generation of sink marks on the design surface of the obtained injection molded product can be easily suppressed as the negative pressure arrival time t is shortened.

In the present invention, the arrival of the resin pressure at a negative pressure means that the resin pressure after the completion of the injection filling becomes 0.

It is possible to adjust the negative pressure arrival time t to be in a predetermined range by controlling the resin pressure of the thermoplastic PP resin composition using a mold clamping force of the design surface mold 110 and the non-design surface mold 112 or by controlling the resin pressure of the thermoplastic PP resin composition by the amount of injection-filled thermoplastic PP resin composition. Among these, it is preferable to adjust the negative pressure arrival time t to be in a predetermined range by controlling the resin pressure of the thermoplastic PP resin composition using the mold clamping force of the design surface mold 110 and the non-design surface mold 112.

In this case, it is preferable to assist in the arrival of the resin pressure at the negative pressure by reducing the mold clamping force (unit: N) of the design surface mold 110 and the non-design surface mold 112 to a value which is obtained by multiplying the product projection area (unit: $mm^2$) of the mold cavity 114 by a pressure of 1 MPa to 20 MPa after the completion of the injection filling of the thermoplastic PP resin composition, and it is more preferable to assist in the arrival of the resin pressure at the negative pressure by reducing the mold clamping force thereof to a value which is obtained by multiplying the product projection area thereof by a pressure of 1 MPa to 10 MPa after the completion of the injection filling of the thermoplastic PP resin composition. Accordingly, the generation of sink marks on the design surface of the injection molded product is more easily suppressed. Particularly when the thickness of the product is thin, the pressure required for filling the inside of the cavity with a melted resin becomes high, and therefore, the resin pressure after the completion of the injection becomes high. In addition, the shrinking volume in a thickness direction also becomes small, and thus, in some cases, it is difficult to cause the resin pressure to reach to the negative pressure within a predetermined time only by controlling the filling amount of resin. Even in this case, it is possible to make the negative pressure arrival time to be within a predetermined time by controlling the resin pressure using the mold clamping force, which is favorable. If the resin pressure after the mold clamping force is reduced is higher than or equal to 20 MPa, in some cases, it is difficult to cause the resin pressure to certainly reach to the negative pressure within a predetermined time only through the decrease in pressure due to cooling shrinkage of the resin thereafter, which is not preferable. In contrast, the resin pressure becomes uneven at less than or equal to 1 MPa, and therefore, in some cases, the resin pressure reaches to the negative pressure through a local step-down operation. In this case, a gap between the design surface side and the mold is easily generated while it is difficult to certainly generate a gap between the non-design surface side and the mold. If a gap is generated between the design surface side and the mold, it is impossible to obtain a desired molded product without sink marks on the design surface, which is not preferable.

The product projection area is an area where the injection molded product 10 within the mold cavity 114 is projected to the design surface mold 110 or the non-design surface mold 112, that is, an area where the injection molded product 10 within the mold cavity 114 is viewed from the design surface mold 110 side or the non-design surface mold 112 side.

The molding is generally performed at a value of the mold clamping force (unit: N) of the design surface mold 110 and the non-design surface mold 112 before the completion of the injection filling of the thermoplastic PP resin composition, which is obtained by multiplying the product projection area (unit: $mm^2$) of the mold cavity 114 by a pressure of 20 MPa to 40 MPa, but is not restricted.

The temperature T1 of the cavity-forming surface 110a of the design surface mold 110 and the temperature T2 of the cavity-forming surface 112a of the non-design surface mold 112 in the molding process may be changed as long as they are within a range satisfying the condition in the injection filling process. However, it is preferable to maintain the temperature of the injection filling process in view of reducing the energy loss.

(Mold Releasing Process)

After the molding process, the injection molded product 10 is released from the mold by opening the design surface mold 110 and the non-design surface mold 112 and by pressing the product using the ejector pin 118.

In the resin injection molding method of the present embodiment, it is preferable that the surface area per unit area of the cavity-forming surface 110a of the design surface mold 110 be greater than the surface area per unit area of the cavity-forming surface 112a of the non-design surface mold 112. Accordingly, the contact area between the thermoplastic PP resin composition filled in the mold cavity 114 and the cavity-forming surface 110a of the design surface mold 110 becomes greater than the contact area between the thermoplastic PP resin composition and the cavity-forming surface 112a of the non-design surface mold 112, and therefore, the thermoplastic PP resin composition is easily in close contact with the cavity-forming surface 110a of the design surface mold 110. For this reason, the sink marks are easily concentrated on the non-design surface side of the injection molded product and are hardly generated on the design surface of the injection molded product.

Surface texturing or satin processing is preferable as the method of making the surface area per unit area of the cavity-forming surface 110a of the design surface mold 110 greater than the surface area per unit area of the cavity-forming surface 112a of the non-design surface mold 112 in terms of workability.

As described above, in the related art, the generation of sink marks on the design surface of the injection molded product cannot be avoided if the crystalline PP resin is used. In addition, when manufacturing an injection molded product provided with a rib and the like on the non-design surface side of a plate-shaped portion, most portions of a rib 214 are in close contact with the recess portion 116 as shown in FIG. 3, and therefore, the drawing resistance of the rib 214 becomes great. For this reason, in some cases, a plate-shaped portion 212 of the injection molded product 210 is deformed while releasing the product from the mold using the ejector pin 118.

In contrast, according to the resin injection molding method of the first embodiment of the present invention, it is possible to sufficiently suppress the generation of sink marks on the design surface of the injection molded product even using the crystalline PP resin, thereby obtaining a high quality injection molded product. In addition, there are many sink marks generated on the non-design surface side in the first embodiment of the present invention, and therefore, a rib 14 is not in close contact with the recess portion 116 as shown in FIG. 2. For this reason, the drawing resistance of the rib 14 while the product is released from the mold using the ejector pin 118 is small, and thus, it is difficult to cause deformation even if the injection molded product 10 has a thin plate-shaped portion 12. Furthermore, in the first embodiment of the present invention, it is unnecessary to use a special mold or to heat or cool the mold repeatedly, and therefore, it is possible to reduce energy loss.

The resin injection molding method of the present invention is not limited to the above-described method using the mold 100.

[Resin Injection Molded Product]

A resin injection molded product according to a second embodiment of the present invention is the injection molded product which is manufactured through the resin injection molding method according to the first embodiment of the present invention as described above. The resin injection molded product according to the second embodiment of the present invention is not limited as long as the product has a design surface and a non-design surface and is manufactured through the resin injection molding method according to the first embodiment of the present invention as described above.

Applications of the injection molded product of the present invention include automobile interior parts such as pillars of an automobile, household electric appliance parts such as top boards of a washing machine, and housing facility products such as toilet seat covers.

EXAMPLES

Hereinafter, the present invention will be described in detail using examples. However, the present invention is not limited by the following description.

Example 1

An injection molded product was manufactured using a commercially available polypropylene resin (rubber component: 1 mass %; analyzed by pyrolysis gas chromatography) as a thermoplastic PP resin composition and using a mold for manufacturing an injection molded product that has a rib with a thickness of 1.5 mm and a pillar shape. The thickness of the rib was set to three kinds including 2.0 mm, 1.5 mm, and 1.2 mm.

Specular processing (#1200) was performed on a cavity-forming surface of a design surface mold in a mold to be used.

In the injection molding of the injection molded product, the temperature $T1$ of the cavity-forming surface of the design surface mold prior to injection filling of the thermoplastic PP resin composition was set to 115° C. and the temperature $T2$ of the cavity-forming surface of the non-design surface mold prior to injection filling of the thermoplastic PP resin composition was set to 110° C. The temperature difference ($T1-T2$) therebetween was set to 5° C. Regarding temperature $T1$ and the temperature $T2$, the temperature immediately before the injection filling was measured using a contact type surface temperature measuring instrument. The barrel temperature was set to 200° C. and the injection filling time was set to 2 seconds while injection-filling the thermoplastic PP resin composition.

In addition, the mold clamping force (unit: N) of the design surface mold and the non-design surface mold before injection filling was set to a value which is obtained by multiplying the product projection area (unit: $mm^2$) of the mold cavity by a pressure of 30 MPa. Then, the resin pressure reached to a negative pressure by reducing the mold clamping force (unit: N) of the design surface mold and the non-design surface mold to a value which is obtained by multiplying the product projection area of the mold cavity by a pressure of 2 MPa, thereby adjusting the negative pressure arrival time t to 3 seconds. The resin pressure was measured using a resin pressure sensor (direct pressure type pressure sensor manufactured by Kistler Japan Co., Ltd.) which was attached to the mold, and the time until the resin pressure reaches to 0 after the completion of the injection filling was defined as the negative pressure arrival time t.

Examples 2 to 15

Injection molded products were obtained by the same manner as that in Example 1 except for the composition of the thermoplastic PP resin composition, the processing method of the cavity-forming surface of the design surface mold, the temperatures $T1$ and $T2$ of the cavity-forming surfaces of the design surface mold and the non-design surface mold, and the negative pressure arrival time t which are changed to the values shown in Tables 1 and 2.

Comparative Examples 1 to 5

Injection molded products were obtained by the same manner as that in Example 1 except for the composition of the thermoplastic PP resin composition, the processing method of the cavity-forming surface of the design surface mold, the temperatures T1 and T2 of the cavity-forming surfaces of the design surface mold and the non-design surface mold, and the negative pressure arrival time t which are changed as shown in Tables 1 and 2.

[Evaluation of Design Surface]

In regards to the design surfaces of the injection molded products which were obtained from the above-described Examples 1 to 15 and Comparative Examples 1 to 5, the states of sink marks in a portion in which a rib having a thickness of 2.0 mm was formed on the non-design surface side, a portion in which a rib having a thickness of 1.5 mm was formed on the non-design surface side, a portion in which a rib having a thickness of 1.2 mm was formed on the non-design surface side, and a portion (general portion) in which no rib was formed on the non-design surface side were evaluated based on the following criteria. The results are shown in Tables 1 and 2.

"A": No sink marks were found.

"B": An extremely few sink marks were found, but were mostly not noticeable, and therefore, there is no problem with a product made therefrom.

"C": Some sink marks were found, but were not very noticeable, and therefore, there is no problem with a product made therefrom.

"D": Noticeable sink marks were found.

TABLE 1

| | Thermoplastic PP resin composition | | Design surface mold | | Non-design surface mold | Temperature difference $(T_1 - T_2)$ (° C.) | Negative pressure arrival time t (second) | Evaluation of design surface | | | |
|---|---|---|---|---|---|---|---|---|---|---|---|
| | Content of crystalline PP resin (mass %) | Content of rubber component (mass %) | Temperature $T_1$ (° C.) | Cavity-forming surface | Temperature $T_2$ (° C.) | | | Rib formation portion (thickness: 2.0 mm) | Rib formation portion (thickness: 1.5 mm) | Rib formation portion (thickness: 1.2 mm) | General portion |
| Example 1 | 99 | 1 | 115 | Specular processing (#1200) | 110 | 5 | 3 | D | C | C | A |
| Example 2 | 90 | 10 | 115 | Specular processing (#1200) | 110 | 5 | 3 | C | C | B | A |
| Example 3 | 85 | 15 | 115 | Specular processing (#1200) | 110 | 5 | 3 | C | B | B | A |
| Example 4 | 75 | 25 | 115 | Specular processing (#1200) | 110 | 5 | 3 | B | B | A | A |
| Example 5 | 75 | 25 | 65 | Specular processing (#1200) | 60 | 5 | 3 | C | B | A | A |
| Example 6 | 75 | 25 | 115 | Honing processing (#200) | 110 | 5 | 3 | B | A | A | A |
| Example 7 | 75 | 25 | 115 | Leather surface texturing (depth: 50 μm) | 110 | 5 | 3 | A | A | A | A |
| Example 8 | 75 | 25 | 115 | Leather surface texturing (depth: 80 μm) | 110 | 5 | 3 | A | A | A | A |
| Example 9 | 75 | 25 | 115 | Leather surface texturing (depth: 100 μm) | 110 | 5 | 3 | A | A | A | A |
| Example 10 | 85 | 15 | 115 | Leather surface texturing (depth: 80 μm) | 110 | 5 | 3 | A | A | A | A |

TABLE 2

| | Thermoplastic PP resin composition | | Design surface mold | | Non-design surface mold | Temperature difference $(T_1 - T_2)$ (° C.) | Negative pressure arrival time t (second) | Evaluation of design surface | | | |
|---|---|---|---|---|---|---|---|---|---|---|---|
| | Content of crystalline PP resin (mass %) | Content of rubber component (mass %) | Temperature $T_1$ (° C.) | Cavity-forming surface | Temperature $T_2$ (° C.) | | | Rib formation portion (thickness: 2.0 mm) | Rib formation portion (thickness: 1.5 mm) | Rib formation portion (thickness: 1.2 mm) | General portion |
| Example 11 | 90 | 10 | 115 | Leather surface texturing (depth: 80 μm) | 110 | 5 | 3 | B | A | A | A |
| Example 12 | 99 | 1 | 115 | Leather surface texturing (depth: 80 μm) | 110 | 5 | 3 | B | B | A | A |

TABLE 2-continued

| | Thermoplastic PP resin composition | | Design surface mold | | Non-design surface mold | Temperature difference ($T_1 - T_2$) (°C.) | Negative pressure arrival time t (second) | Evaluation of design surface | | | |
|---|---|---|---|---|---|---|---|---|---|---|---|
| | Content of crystalline PP resin (mass %) | Content of rubber component (mass %) | Temperature $T_1$ (°C.) | Cavity-forming surface | Temperature $T_2$ (°C.) | | | Rib formation portion (thickness: 2.0 mm) | Rib formation portion (thickness: 1.5 mm) | Rib formation portion (thickness: 1.2 mm) | General portion |
| Example 13 | 75 | 25 | 80 | Leather surface texturing (depth: 80 μm) | 70 | 10 | 3 | B | A | A | A |
| Example 14 | 75 | 25 | 115 | Leather surface texturing (depth: 80 μm) | 110 | 5 | 5 | B | B | A | A |
| Example 15 | 75 | 25 | 115 | Leather surface texturing (depth: 80 μm) | 110 | 5 | 7 | C | B | B | A |
| Comparative Example 1 | 100 | 0 | 115 | Specular processing (#1200) | 110 | 5 | 3 | D | D | D | A |
| Comparative Example 2 | 75 | 25 | 115 | Specular processing (#1200) | 115 | 0 | 3 | B | B | A | D |
| Comparative Example 3 | 75 | 25 | 115 | Specular processing (#1200) | 55 | 60 | 3 | D | D | C | A |
| Comparative Example 4 | 75 | 25 | 115 | Leather surface texturing (depth: 80 μm) | 110 | 5 | 8 | D | D | C | A |
| Comparative Example 5 | 75 | 25 | 115 | Leather surface texturing (depth: 80 μm) | 110 | 5 | 10 | D | D | C | A |

The injection molded products of Examples 1 to 15 which were molded through the resin injection molding method according to the first embodiment of the present invention were made of a crystalline PP resin. However, in the injection molded products thereof, generation of sink marks on the design surface of a portion on which a rib was formed on the non-design surface side was suppressed and the generation of sink marks on the entire design surface was also suppressed compared to Comparative Examples 1 and 3 to 5. In addition, in Examples 7 to 11 in which leather surface texturing was performed on the cavity-forming surfaces of the design surface molds, the generation of sink marks on the design surface was more suppressed compared Examples 1 to 4 and 6 in which specular processing or honing processing was performed on the cavity-forming surfaces of the design surface molds.

Meanwhile, in Comparative Example 1 in which a thermoplastic PP resin composition which does not contain a rubber component was used, noticeable sink marks were generated in all of the portions of the design surface in which ribs having thicknesses of 1.2 mm, 1.5 mm, and 2.0 mm were provided.

In Comparative Example 2 in which the temperature difference (T1−T2) between the cavity-forming surfaces of the design surface mold and the non-design surface mold prior to the injection filling was less than +5° C., no sink marks are generated in the portions of the design surface in which the ribs were provided. However, there were noticeable sink marks in the portion of the design surface in which the rib is not provided and overall design property was deteriorated. In addition, in Comparative Example 3 in which the temperature difference (T1−T2) exceeds+50° C., noticeable sink marks were generated in the portion of the design surface in which the ribs having thicknesses of 1.5 mm and 2.0 mm were provided.

In addition, in Comparative Examples 4 and 5 in which the negative pressure arrival time t exceeds 7 seconds, noticeable sink marks were generated in the portion of the design surface in which the ribs having thicknesses of 1.5 mm and 2.0 mm were provided.

REFERENCE SIGNS LIST

10 . . . Injection molded product, 10a . . . Design surface, 10b . . . Non-design surface, 12 . . . Plate-shaped portion, 14 . . . Rib, 100 . . . Mold, 110 . . . Design surface mold, 110a . . . Cavity-forming surface, 112 . . . Non-design surface mold, 112a . . . Cavity-forming surface, 114 . . . Mold cavity, 116, Recess portion, 118 . . . Ejector pin

What is claimed is:

1. A resin injection molding method of molding a resin by injection-filling an inside of a mold cavity, which is formed by mold-clamping a pair of design surface mold and non-design surface mold, with a melted thermoplastic polypropylene resin composition, the method comprising:

setting a temperature of each of cavity-forming surfaces of the design surface mold and the non-design surface mold prior to the injection filling to 60° C. to 120° C., and setting the temperature of the cavity-forming surface of the design surface mold to be higher than the temperature of the cavity-forming surface of the non-design surface mold by 5° C. to 50° C., and causing the resin pressure to reach to a negative pressure within 7 seconds after completion of the injection filling of the thermoplastic polypropylene resin composition, wherein the thermoplastic polypropylene resin composition contains a crystalline polypropylene resin and a rubber component and a content of the rubber component is 1 mass % to 40 mass %.

2. The resin injection molding method according to claim 1, wherein a surface area per unit area of the cavity-forming surface of the design surface mold is larger than a surface area per unit area of the cavity-forming surface of the non-design surface mold.

3. The resin injection molding method according to claim 1, wherein the resin pressure reaches to the negative pressure by reducing a mold clamping force, unit: N, of the design surface mold and the non-design surface mold to a value which is obtained by multiplying the product projection area, unit: $mm^2$, of the mold cavity by a pressure of 1 MPa to 20 MPa after the completion of the injection filling of the thermoplastic polypropylene resin composition.

4. The resin injection molding method according to claim 2, wherein the resin pressure reaches to the negative pressure by reducing a mold clamping force, unit: N, of the design surface mold and the non-design surface mold to a value which is obtained by multiplying the product projection area, unit: $mm^2$, of the mold cavity by a pressure of 1 MPa to 20 MPa after the completion of the injection filling of the thermoplastic polypropylene resin composition.

* * * * *